United States Patent [19]
Ishii et al.

[11] Patent Number: 6,075,337
[45] Date of Patent: Jun. 13, 2000

[54] SPEED CONTROL APPARATUS FOR INDUCTION MOTOR

[75] Inventors: Shinichi Ishii, Saitama; Hirokazu Tajima, Tokyo, both of Japan

[73] Assignee: Fuji Electric Co., Ltd., Kawasaki, Japan

[21] Appl. No.: 09/309,909

[22] Filed: May 11, 1999

[30]    Foreign Application Priority Data

Jun. 30, 1998   [JP]   Japan .................................. 10-185156

[51] Int. Cl.⁷ ....................................................... H02P 5/34
[52] U.S. Cl. ........................................... 318/801; 318/807
[58] Field of Search ..................................... 318/799–817

[56]            References Cited

U.S. PATENT DOCUMENTS

| | | | |
|---|---|---|---|
| 4,808,903 | 2/1989 | Matsui et al. ............................ | 318/800 |
| 5,003,243 | 3/1991 | Tadakuma et al. ...................... | 318/800 |
| 5,032,771 | 7/1991 | Kerkman et al. ......................... | 318/52 |
| 5,298,847 | 3/1994 | Kerkman et al. ........................ | 318/800 |
| 5,329,217 | 7/1994 | Kerkman et al. ........................ | 318/811 |
| 5,334,923 | 8/1994 | Lorenz et al. ............................ | 318/805 |
| 5,502,360 | 3/1996 | Kerkman et al. ........................ | 318/805 |
| 5,598,081 | 1/1997 | Okamura et al. ....................... | 318/801 |
| 5,619,114 | 4/1997 | Blasko .................................... | 318/812 |
| 5,796,236 | 8/1998 | Royak .................................... | 318/804 |
| 5,814,967 | 9/1998 | Garces et al. ........................... | 318/807 |
| 5,886,498 | 3/1999 | Sul et al. ................................. | 318/821 |

FOREIGN PATENT DOCUMENTS 7-143800   6/1995   Japan .

*Primary Examiner*—Brian Sircus
*Assistant Examiner*—Rina I. Duda
*Attorney, Agent, or Firm*—Kanesaka & Takeuchi

[57]            ABSTRACT

A control apparatus for an induction motor includes a current detector for detecting the current of the induction motor; a first coordinate transformer for resolving the current into an exciting current component and a load current component; a slip value calculator for calculating a slip angular frequency of the induction motor based on the load current component; a correction value calculator for calculating a correction value for the slip angular frequency of the induction motor in response to the change of the exciting current component; a multiplier for correcting the slip angular frequency by using the correction value calculated in the correction value calculator; an adder for calculating a reference primary angular frequency based on the corrected slip angular frequency; a voltage vector calculator for calculating a reference voltage value based on the reference primary angular frequency; and a second coordinate transformer for feeding the calculated reference voltage value to the inverter. The control apparatus keeps the rotating speed of the induction motor at a predetermined value when the slip frequency change occurs due to temperature rise in the induction motor.

6 Claims, 4 Drawing Sheets

SPEED CONTROL APPARATUS FOR INDUCTION MOTOR

BACKGROUND OF THE INVENTION AND RELATED ART STATEMENT

The present invention relates to a control apparatus for controlling a speed of an induction motor that is driven by a PWM inverter and so on. More specifically, the present invention relates to a control apparatus for controlling the speed of an induction motor at a certain value.

The speed of an induction motor (herein after sometimes referred to broadly as an "induction machine" or a "machine") is controlled by compensating a slip obtained from generated torque or from a signal proportional to the generated torque. In controlling the induction motor speed by this method, the induction motor speed changes sometimes during continuous load driving due to changes of the machine constants. Alternatively, the speed of an induction motor that does not include any speed sensor is controlled by the so-called sensor-less trans-vector control method. In controlling the speed of the induction motor by this method, the induction motor speed also changes sometimes during continuous load driving due to changes of the machine constants.

While an induction motor is continuously driving with a load, the resistance values of a stator winding and a rotor conductor rise as the temperature of the induction motor rises. Due to this, deviations occur between the machine constants set in the control apparatus and actual machine constants, and the speed of the induction motor changes.

These phenomena will be explained based on the voltage and current equations for the induction machine. The voltage equation of the induction machine that uses the d-q rotational coordinate is described by the following equation (1). Here, the d-axis is an axis of coordinate set on the magnetic flux axis of the rotating magnetic field and the q-axis is an axis of coordinate perpendicular to the d-axis.

$$\begin{vmatrix} v_{1d} \\ v_{1q} \\ 0 \\ 0 \end{vmatrix} = \begin{vmatrix} r_1 + r_2 + p \cdot 1\sigma & -\omega 1\sigma & -1/\tau_2 & -\omega_2 \\ \omega_1 \cdot 1\sigma & r_1 + r_2 + p \cdot 1\sigma & \omega_2 & -1/\tau_2 \\ -r_2 & 0 & p + 1/\tau_2 & \omega_2 - \omega_1 \\ 0 & -r_2 & \omega_1 - \omega_2 & p + 1/\tau_2 \end{vmatrix} \begin{vmatrix} i_{1d} \\ i_{1q} \\ \phi_{2d} \\ \phi_{2q} \end{vmatrix} \quad (1)$$

Here, $r_1$ is a resistance value of a stator winding; $r_2$ is a resistance value of a rotor conductor; $l\sigma$ is a leakage inductance; $\omega_1$ is a primary angular frequency (applied frequency); $\omega_2$ is a secondary angular frequency (rotating speed of the rotor); $\tau_2 = I_m/r_2$ ($I_m$ is an exciting inductance); $v_{1d}$ is a d-axis component of a primary voltage; $v_{1q}$ is a q-axis component of the primary voltage; $i_{1d}$ is a d-axis component of a primary current (exciting current component); $i_{1q}$ is a q-axis component of the primary current (load current component); $\Phi_{2d}$ is a d-axis component of a secondary magnetic flux; $\Phi_{2q}$ is a q-axis component of the secondary magnetic flux; and p is a differential operator.

Assuming that the axis of the magnetic flux of the induction motor is on the d-axis in the stationary state in equation 1, $\Phi_{2d}$ will be constant, $\Phi_{2q}$ will be zero and p will be zero. By rewriting equation (1), following equations (2) through (5) are obtained.

$$\omega_{s1} = \omega_1 - \omega_2 = r_2 \cdot (i_{1q}/\Phi_{2d}) \quad (2)$$

Here, $\omega_{s1}$ is a slip angular frequency (hereinafter referred to as a "slip value").

$$\Phi_{2d} = I_m \cdot i_{1d} \quad (3)$$

$$v_{1d} = r_1 \cdot i_{1d} - \omega_1 \cdot 1\sigma \cdot i_{1q} \quad (4)$$

$$v_{1q} = r_1 \cdot i_{1q} + \omega_1 \cdot 1\sigma \cdot i_{1d} + \omega_1 \cdot \Phi_{2d} \quad (5)$$

As equation (2) indicates, the slip value $\omega_{s1}$ changes as the resistance value $r_2$ of the rotor conductor changes. As the resistance value $r_1$ of the stator winding changes, the d-axis component of the primary current $i_{1d}$ changes as shown in equation (4) when $v_{1d}$ is constant, resulting in change of the right side of equation (3). The resulting change in the right side of equation (3) changes the denominator on the right side of equation (2), further resulting in change of the slip value $\omega_{s1}$.

In short, changes of the resistance values of the stator winding and the rotor conductor cause slip value change, which further causes change of the rotating speed of the induction motor.

In view of the foregoing, it is an object of the invention to provide a control apparatus that facilitates keeping a rotating speed of an induction motor at a predetermined value by appropriately feeding the changes, caused in resistance values of a stator winding and a rotor conductor due to temperature rise in the induction motor at a time of continuous driving with a load, back to the machine constants.

SUMMARY OF THE INVENTION

When the inverter feeds the d-axis component of the primary voltage, a cross term of which due to leakage inductance $l\sigma$ is compensated, to the induction motor, it may be considered that the second term on the right side of equation (4) is compensated to be zero. Therefore, the reference d-axis component $V_{1d}^*$ for the primary voltage that the inverter generates is given by the following equation (6).

$$v_{1d}^* = r_1 \cdot i_{1d} \quad (6)$$

On the other hand, the reference d-axis component of the primary voltage is constant, since it is calculated based on the constants set in the control apparatus. In the other words, the d-axis component $i_{1d}$ of the primary current changes when the resistance value $r_1$ of the stator winding changes. The stator winding and the rotor conductor are housed in the same structure. Therefore, assuming that the rates of temperature rise of the stator winding and the rotor conductor are the same, the change of the d-axis component $i_{1d}$ of the primary current may be deemed as a change of the resistance value $r_1$ of the rotor conductor $r_1$.

Now a first embodiment according to the invention will be outlined.

Considering that the reference d-axis component $v_{1d}^*$ of the primary voltage is constant, if the d-axis component of the primary current for the resistance value of the stator winding $r_1(1)$ is $i_{1d}(1)$, and the d-axis component for the resistance value of the stator winding $r_1(2)$ is $i_{1d}(2)$, the following equation (7) will be obtained from the foregoing equation (6).

$$v_{1d}^* = r_1(1) \cdot i_{1d}(1) = r_1(2) \cdot i_{1d}(2) \quad (7)$$

By changing equation (7), the ratio of $r_1(1)$ and $r_1(2)$ is obtained from the following equation (8). As equation (8)

indicates, the ratio of the resistance values of the stator winding is obtained from the current ratio.

$$r_1(2)/r_1(1)=i_{1d}(1)/i_{1d}(2) \tag{8}$$

Assuming further that the resistance value $r_1$ of the stator winding and the resistance value $r_2$ of the rotor conductor change in proportion to each other, the following equation (9) will be obtained.

$$r_1(2)/r_1(1)=r_2(2)/r_2(1)=i_{1d}(1)/i_{1d}(2) \tag{9}$$

Here, $i_{1d}(1)$ is the d-axis component of the primary current when the resistance value of the rotor conductor is $r_2(1)$ and $i_{1d}(2)$ is the d-axis component of the primary current when the resistance value of the rotor conductor is $r_2(2)$.

By substituting equations (3) and (6) into equation (2) that described the slip value and by rewriting equation (2), the following equation (10) is obtained.

$$\omega_{s1}=r_2 \cdot (i_{1q}/\Phi_{2d})=r_2 \cdot i_{1q}/(l_m \cdot i_{1d})=r_2 \cdot i_{1q}/[l_m \cdot (v_{1d}*/r_1)]=r_1 \cdot r_2 \cdot i_{1q}/(l_m \cdot v_{1d}*) \tag{10}$$

If, in the resistance values $r_1(1)$ and $r_2(1)$, the d-axis component of the primary current is $i_{1d}(1)$ and the slip value is $\omega_{s1}(1)$, and in the resistance values $r_1(2)$ and $r_2(2)$, the d-axis component of the primary current is $i_{1d}(2)$ and the slip value is $\omega_{s1}(2)$, slip value $\omega_{s1}(1)$ will be obtained by the following equation (11) and the slip value $\omega_{s1}(2)$ will be obtained by the following equation (12).

$$\omega_{s1}(1)=r_1(1) \cdot r_2(1) \cdot \{i_{1q}/(l_m \cdot v_{1d}*)\} \tag{11}$$

$$\omega_{s1}(2)=r_1(2) \cdot r_2(2) \cdot \{i_{1q}/(l_m \cdot v_{1d}*)\} \tag{12}$$

The following equation (13) is obtained by obtaining the slip value ratio from equations (11) and (12) and by substituting the slip value ratio into equation (9).

$$\omega_{s1}(2)/\omega_{s1}(1)=\{r_1(2)/r_1(1)\} \cdot \{r_2(2)/r_2(1)\}=\{i_{1d}(1)/i_{1d}(2)\} \cdot \{i_{1d}(1)/i_{1d}(2)\}=\{i_{1d}(1)/i_{1d}(2)\}^2 \tag{13}$$

Thus, the speed of the induction motor is kept at a certain value by compensating the slip value by the value obtained from equation (13).

Now a second embodiment according to the invention will be outlined.

As described before, the slip value $\omega_{s1}(1)$ is given by equation (2). If $\Phi_{2d}$ in equation (2) is kept at a certain value, the ratio of the slip values is obtained by the following equation (14), since the first terms and the third terms on the right sides of equations (11) and (12) are identical with each other, respectively.

$$\omega_{s1}(2)/\omega_{s1}(1)=\{r_2(2)/r_2(1)\}=\{i_{1d}(1)/i_{1d}(2)\}$$

Thus, the speed of the induction motor is kept at a certain value by compensating the slip value $\omega_{s1}$ according to equation (14). Then, the method for keeping $\Phi_{2d}$ at a certain value will be described.

By considering equations (3) and (6), the secondary magnetic flux $\Phi_{2d}$ is described by the following equation (15).

$$\Phi_{2d}=l_m \cdot i_{1d}=l_m \cdot (v_{1d}*/r_1) \tag{15}$$

The relational expression of the reference d-axis component $v_{1d}*$ of the primary voltage is obtained by regarding the d-axis component of the primary current for $r_1(1)$ and $r_2(1)$ as $i_{1d}(1)$, the reference d-axis component of the primary voltage for $r_1(1)$ and $r_2(1)$ as $v_{1d}*(1)$, the d-axis component of the primary current for $r_1(2)$ and $r_2(2)$ as $i_{1d}(2)$, and the reference d-axis component of the primary voltage for $r_1(2)$ and $r_2(2)$ as $v_{1d}*(2)$.

At first, the secondary magnetic flux $\Phi_{2d}(1)$ for $r_1(1)$ and $r_2(1)$ is expressed by the following equation (16) and the secondary magnetic flux $\Phi_{2d}(2)$ for $r_1(2)$ and $r_2(2)$ is expressed by the following equation (17).

$$\Phi_{2d}(1)=l_m \cdot i_{1d}(1)=l_m \cdot \{v_{1d}*(1)/r_1(1)\} \tag{16}$$

$$\Phi_{2d}(2)=l_m \cdot i_{1d}(2)=l_m \cdot \{v_{1d}*(2)/r_1(2)\} \tag{17}$$

The secondary magnetic fluxes $\Phi_{2d}(1)$ and $\Phi_{2d}(2)$ are identical with each other when $v_{1d}*(1)/r_1(1)=v_{1d}*(2)/r_1(2)$. The following equation (18) is obtained by changing the above equation and by introducing equation (9).

$$v_{1d}*(2)/v_{1d}*(1)=r_1(2)/r_1(1)=i_{1d}(1)/i_{1d}(2) \tag{18}$$

Thus, the secondary magnetic flux is kept at a certain value and the change of the slip value is compensated by compensating the change of the resistance value of the stator winding based on equation (18).

As explained above, since the changes of the resistance values of the stator winding and the rotor conductor are detectable by detecting the change of the exciting current, and the constants set in the control apparatus are correctable based on the detected exciting current change, the rotating speed of the induction motor is kept at a constant value even when the temperature of the induction motor rises due to continuously driving the load.

A third embodiment and a fourth embodiment according to the invention are based on the principles of the first embodiment and the second embodiment, respectively. The third and fourth embodiments are different, as will be described later, from the first and the second embodiments, respectively, in the structures of their slip value calculators.

DETAILED DESCRIPTION OF PREFERRED EMBODIMENTS

Figure 1:
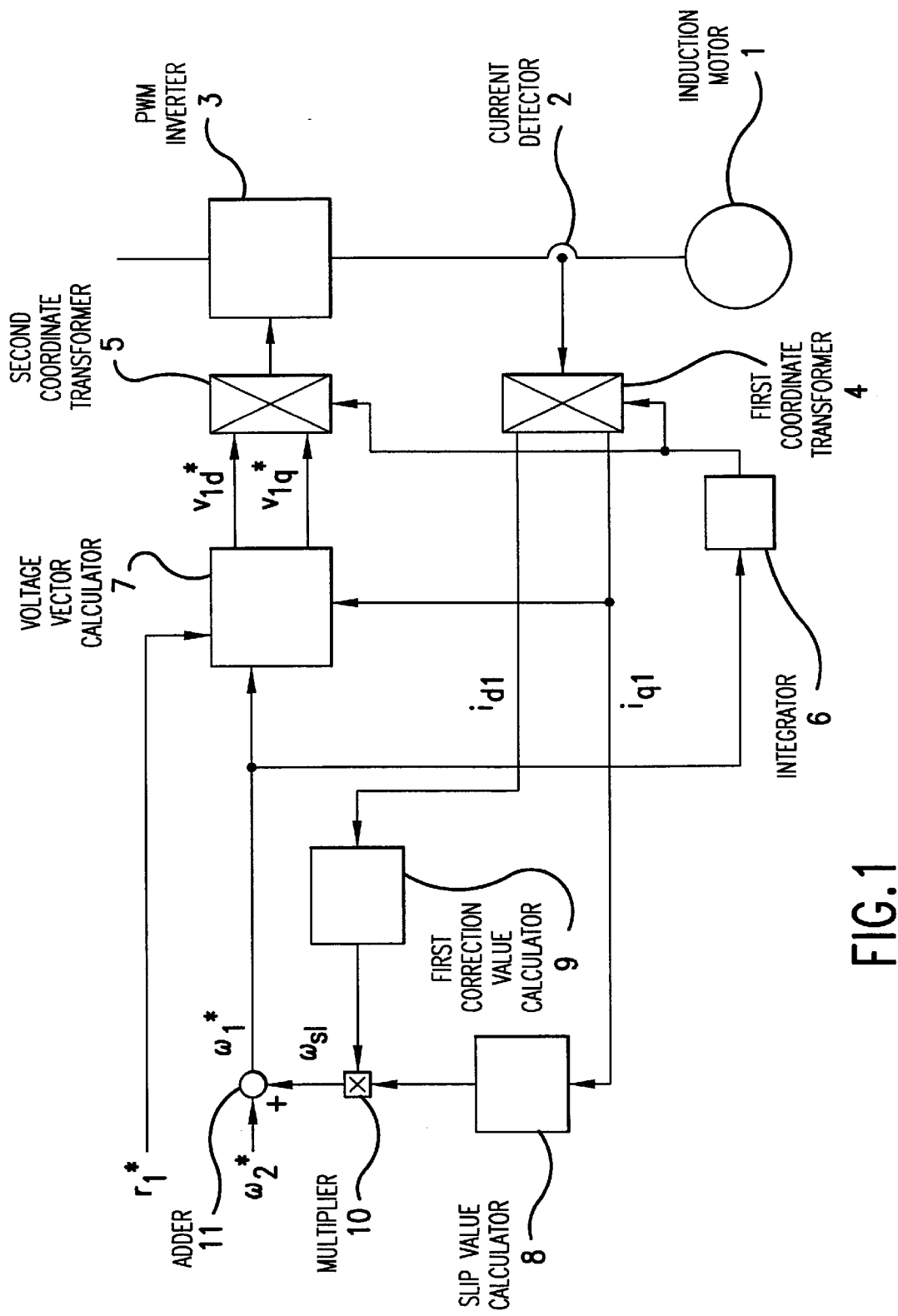
FIG. 1 is a block diagram of a control apparatus for controlling a speed of an induction motor according to a first embodiment of the invention.

Now the present invention will be explained hereinafter with reference to the accompanied drawings which illustrate the preferred embodiments of the invention. Throughout these figures, the same parts are designated by the same reference numerals and their duplicated explanations are omitted for the sake of simplicity.

FIG. 1 is a block diagram of a control apparatus for controlling the speed of an induction motor according to the first embodiment of the invention. Referring now to FIG. 1, the reference numeral 1 designate an induction motor, 2 a current detector, and 3 a PWM inverter that drives the induction motor.

The current detected by the current detector 2 is fed to a first coordinate transformer 4. The first coordinate transformer 4 resolves the fed current into a d-axis component $i_{d1}$ and a q-axis component $i_{q1}$ of the primary current. The d-axis component $i_{d1}$ is inputted to a first correction value calculator 9 and the q-axis component $i_{q1}$ is inputted to a slip value calculator 8. The slip value converted from the q-axis component $i_{q1}$ of the primary current using equation (2) in the slip value calculator 8 and the output from the first correction value calculator 9 are multiplied in a multiplier 10. The result of the multiplication in the multiplier 10 is inputted to the adder 11 as a corrected slip value $\omega_{s1}$.

The first correction value calculator 9, to which the d-axis component $i_{d1}$ of the primary current is inputted, calculates the ratio of the slip values corresponding to the change of the resistance value of the stator winding or the rotor conductor using equation (13) as a correction value. By multiplying this correction value and the slip value fed from the slip value calculator 8 in the multiplier 10, the slip value $\omega_{s1}$ is corrected based on the d-axis component $i_{d1}$ of the primary current.

The adder 11 calculates a reference primary angular frequency $\omega_1^*$ by adding a reference secondary angular frequency $\omega_2^*$ and the corrected slip value $\omega_{s1}$. The reference primary angular frequency $\omega_1^*$ is fed to a voltage vector calculator 7 and an integrator 6.

The voltage vector calculator 7 calculates the values of d- and q-axis components of the primary voltage and feeds the calculated d- and q-axis components of the primary voltage to a second coordinate transformer 5 as reference values $v_{1d}^*$ and $v_{1q}^*$ based on equations 4 nd 5. The reference value $r_1^*$ of the stationary winding resistance is inputted also to the voltage vector calculator 7.

The integrator 6 calculates a reference vector position based on the reference primary angular frequency $\omega_1^*$ and feeds the calculated reference vector position to the first coordinate transformer 4 and the second coordinate transformer 5.

The second coordinate transformer 5 calculates the output voltage of the inverter based on the reference d-axis component $v_{1d}^*$ of the primary voltage, the reference q-axis component $v_{1q}^*$ of the primary voltage and the reference vector position. The second coordinate transformer 5 feeds the results of the calculation to the PWM inverter 3 to make the PWM inverter 3 generate an AC voltage. The induction motor 1 is driven by the AC voltage supplied from the PWM inverter 3. The current of the induction motor 1 is detected by the current detector 2.

Figure 2:
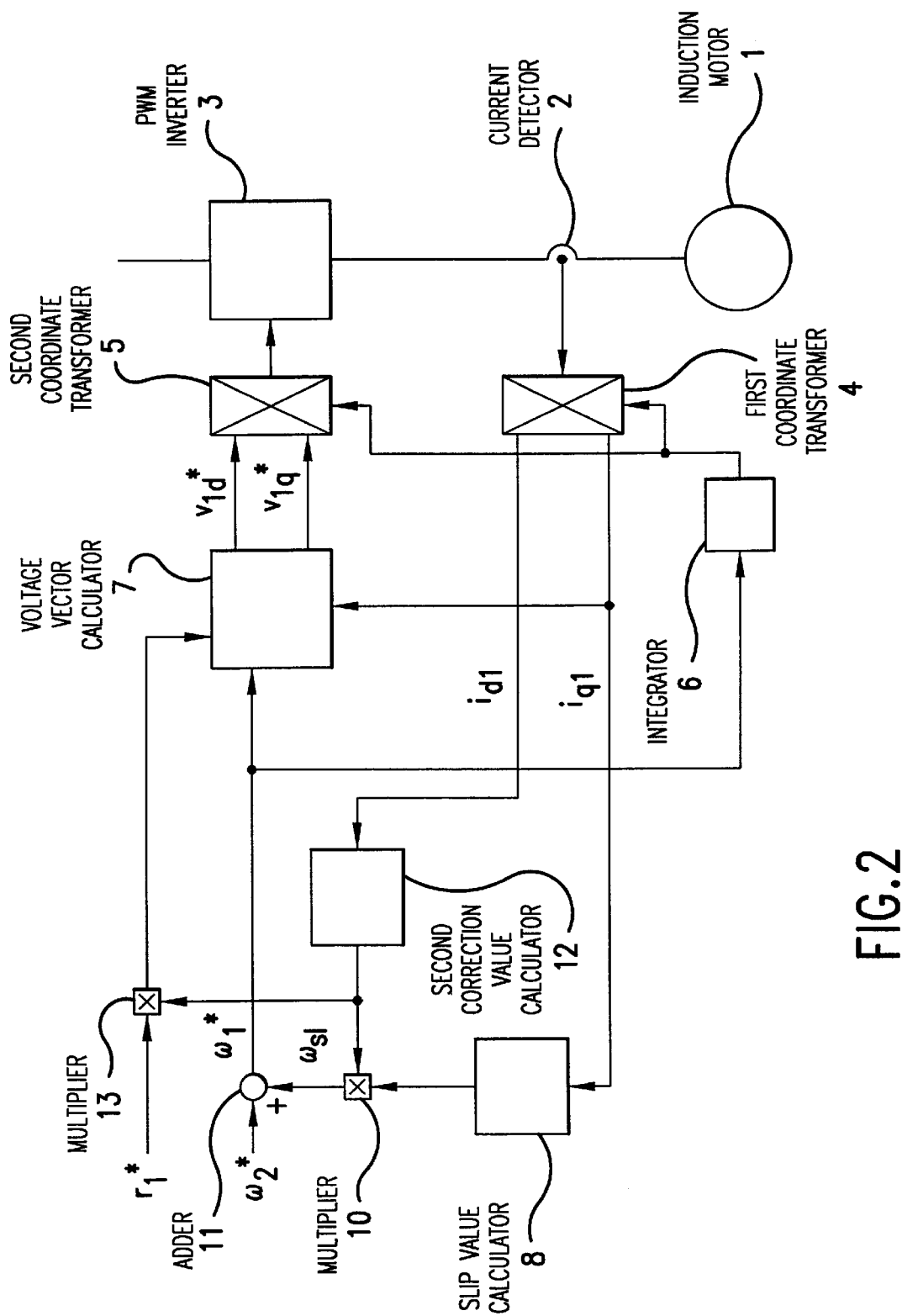
FIG. 2 is a block diagram of a control apparatus for controlling a speed of an induction motor according to a second embodiment of the invention.

FIG. 2 is a block diagram of a control apparatus for controlling the speed of an induction motor according to the second embodiment of the invention.

Referring now to FIG. 2, the d-axis component $i_{d1}$ of the primary current is inputted to a second correction value calculator 12, output of which is inputted to the multiplier 10 and a multiplier 13. The multiplier 13 multiplies the output of the second correction value calculator 12 and the reference value $r_1^*$ of the stationary winding resistance. The multiplier 13 feeds the result of the multiplication to the voltage vector calculator 7.

The second correction value calculator 12 calculates the correction values for the slip value (resistance value of the rotor conductor) and for the resistance value of the stator winding based on equations 14 and 18, respectively, using the state of the d-axis component of the primary current $i_{d1}$.

The correction value for the slip value is inputted to the multiplier 10 to correct the slip value. The correction value for the resistance of the stator winding is inputted to the multiplier 13 to correct the set resistance value $r_1^*$ of the stator winding.

Figure 3:
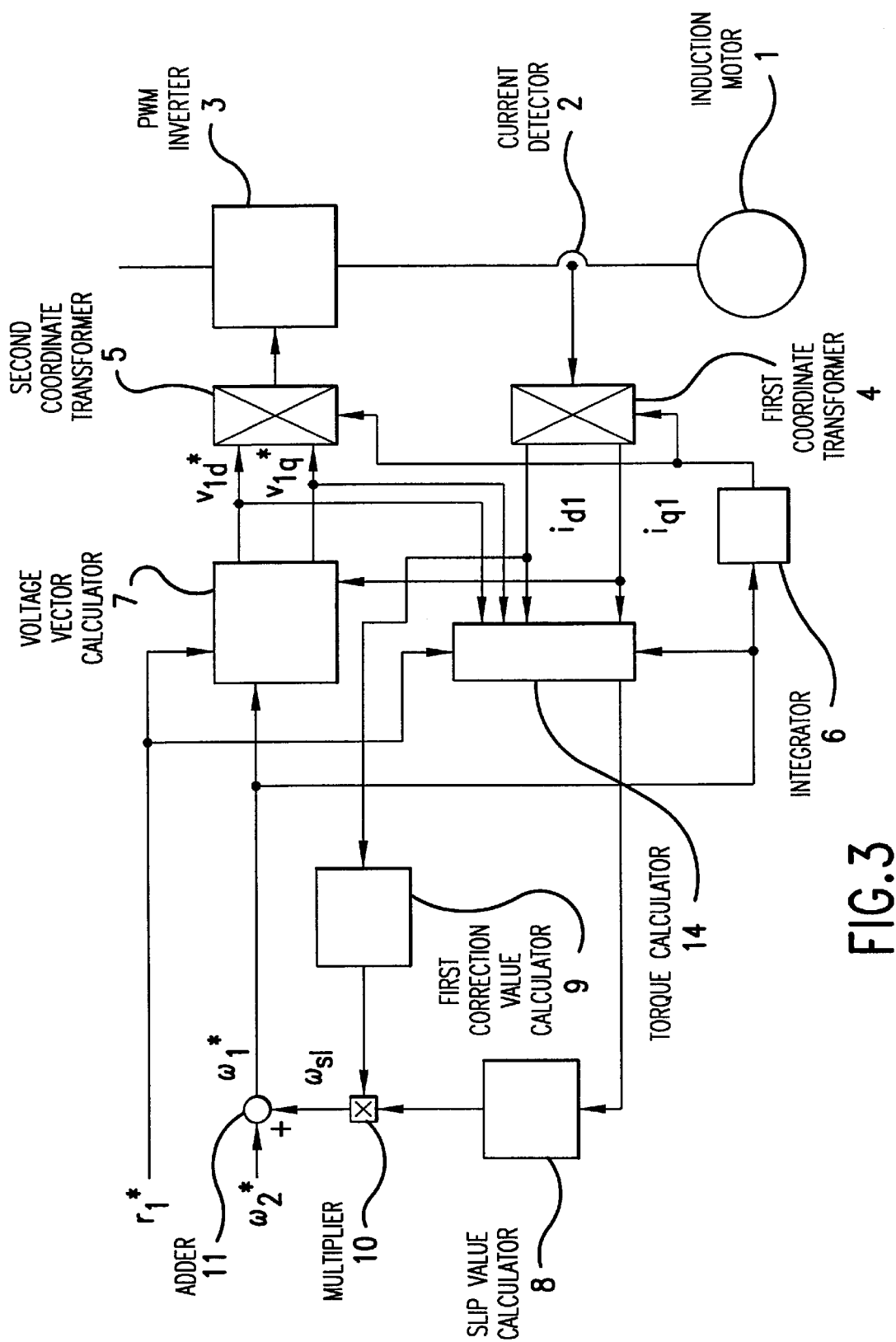
FIG. 3 is a block diagram of a control apparatus for controlling a speed of an induction motor according to a third embodiment of the invention.

FIG. 3 is a block diagram of a control apparatus for controlling the speed of an induction motor according to the third embodiment of the invention.

Referring now to FIG. 3, a torque calculator 14 calculates the torque generated in the induction motor 1 from a reference d-axis component of the primary voltage $v_{d1}^*$, a reference q-axis component of the primary voltage $v_{q1}^*$, a reference d-axis component of the primary current $i_{d1}^*$, a reference q-axis component of the primary current $i_{q1}^*$, a set resistance value of the stator winding $r_1^*$, and a reference primary angular frequency $\omega_1^*$. The generated torque is inputted to the slip value calculator 8 to obtain a slip value using the slip-torque characteristics. Then, the slip value is corrected by using the output of the first correction value calculator 9.

Figure 4:
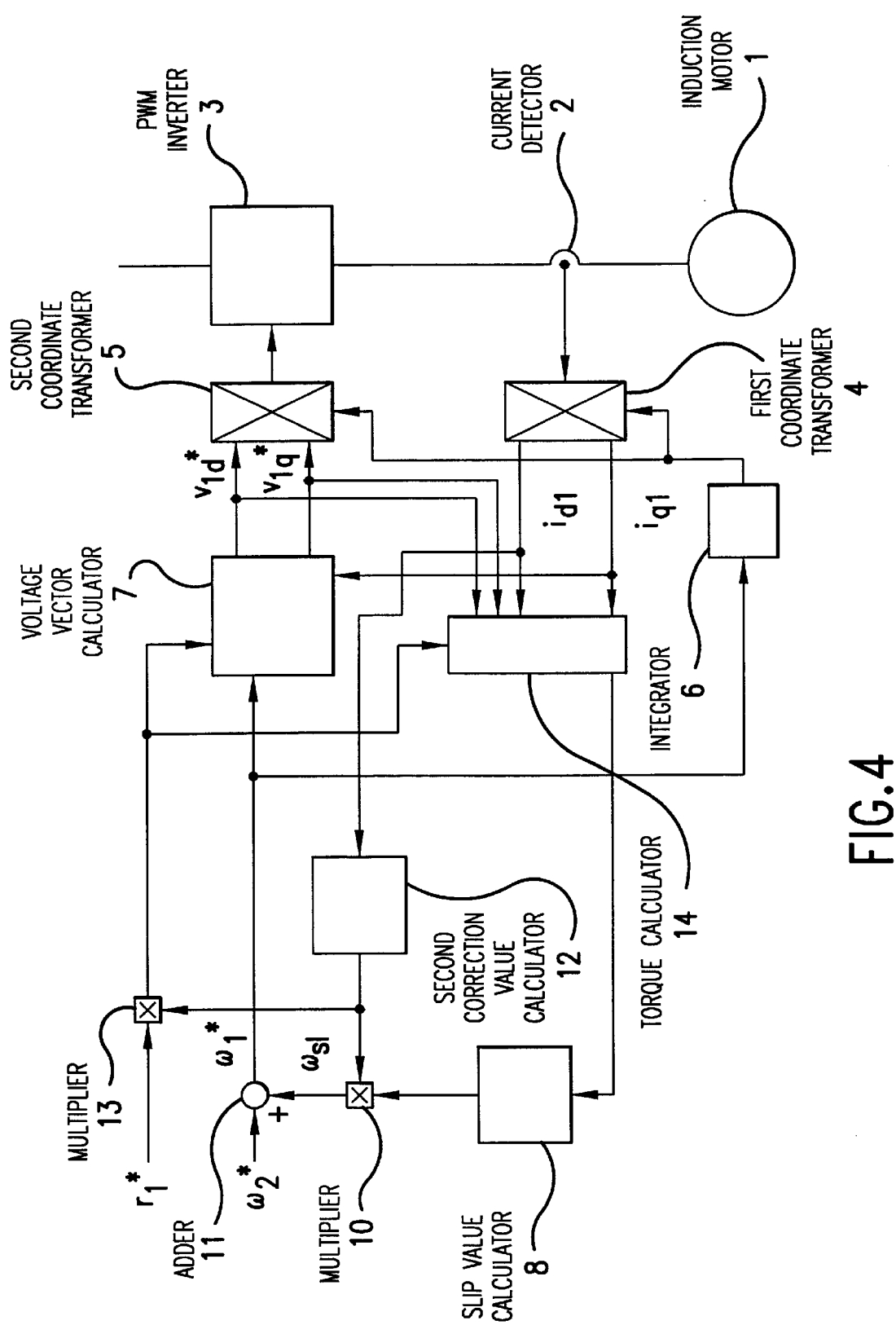
FIG. 4 is a block diagram of a control apparatus for controlling a speed of an induction motor according to a fourth embodiment of the invention.

FIG. 4 is a block diagram of a control apparatus for controlling the speed of an induction motor according to the fourth embodiment of the invention.

The control apparatus of FIG. 4 includes the control apparatus of FIG. 2, to which the torque calculator 14 of FIG. 3 is added. The way of calculating the slip value in the slip value calculator 8 is the same as that in the third embodiment.

The ways of calculating the correction value for the slip value (resistance value of the rotor conductor) and the correction value for the resistance value of the stator winding are the same as those of the second embodiment.

According to the fourth embodiment, the slip value (resistance value of the rotor conductor) is corrected based on the torque caused in the induction motor 1, and the resistance value of the stator winding is corrected based on the d-axis component of the primary current $i_{d1}$.

As explained above, since the changes of the resistance values of the stator winding and the rotor conductor are corrected based on the change of the d-axis component of the primary current (exciting current component) according to the invention, the rotating speed of the sensor less induction motor is kept at a certain value even when temperature rise occurs in the induction motor due to its continuous load drive.

What is claimed is:

1. A control apparatus for an inverter for driving an induction motor at a predetermined value, comprising:

detecting means for detecting a current of the induction motor;

resolving means connected to the detecting means for resolving the current detected by the detecting means into an exciting current component and a load current component;

slip value calculating means connected to the resolving means for calculating a slip angular frequency of the induction motor based on the load current component;

correction value calculating means connected to the resolving means, said correction value calculating means calculating a correction value for a slip angular frequency of the induction motor in response to a change of the exciting current component;

correcting means connected to the slip value calculating means and the correction value calculating means, said correcting means correcting the slip angular frequency calculated in the slip value calculating means by using the correction value calculated in the correction value calculating means;

reference frequency calculating means connected to the correcting means for calculating a reference primary angular frequency based on the corrected slip angular frequency corrected in the correcting means; and reference voltage calculating means connected to the reference frequency calculating means, said reference voltage calculating means calculating a reference voltage value based on the reference primary angular frequency and feeding the calculated reference voltage value to the inverter.

2. A control apparatus according to claim 1, wherein said correction value calculating means further calculates a correction value for a resistance of the stator winding in response to the change of the exciting current component, said control apparatus further comprising second correcting means situated between the correction value calculating means and the reference voltage calculating means, said second correcting means receiving the correction value and correcting the resistance value of the stator winding so that the reference voltage calculating means calculates the reference voltage value based on the corrected resistance value of the stator winding together with the reference primary angular frequency.

3. A control apparatus according to claim 1, wherein said reference voltage calculating means includes a voltage vector calculator connected to the reference frequency calculating means for calculating values of axis components of a primary voltage, a coordinate transformer situated between the voltage vector calculator and the inverter, and an integrator situated between the reference frequency calculating means and the coordinate transformer for calculating a reference vector position, said coordinate transformer calculating the reference voltage value based on the values of the axis components of the primary voltage and the reference vector position.

4. A control apparatus for an inverter for driving an induction motor at a predetermined value, comprising:

detecting means for detecting a current of the induction motor;

resolving means connected to the detecting means for resolving the current detected by the detecting means into an exciting current component and a load current component;

slip value calculating means connected to the resolving means for calculating a slip angular frequency of the induction motor based on a torque caused in the induction motor;

correction value calculating means connected to the resolving means, said correction value calculating means calculating a correction value for a slip angular frequency of the induction motor in response to a change of the exciting current component;

correcting means connected to the slip value calculating means and the correction value calculating means, said correcting means correcting the slip angular frequency calculated in the slip value calculating means by using the correction value calculated in the correction value calculating means;

reference frequency calculating means connected to the correcting means for calculating a reference primary angular frequency based on the corrected slip angular frequency corrected in the correcting means;

reference voltage calculating means connected to the reference frequency calculating means, said reference voltage calculating means calculating a reference voltage value based on the reference primary angular frequency and feeding the calculated reference voltage value to the inverter; and torque calculating means connected to the reference voltage calculating means and resolving means, said torque calculating means calculating the torque caused in the induction motor based on the reference voltage value, the exciting current component, the load current component and the reference primary angular frequency.

5. A control apparatus according to claim 4, wherein said correction value calculating means further calculates a correction value for a resistance of the stator winding in response to the change of the exciting current component, said control apparatus further comprising second correcting means situated between the correction value calculating means and the reference voltage calculating means, said second correcting means receiving the correction value and correcting the resistance value of the stator winding so that the reference voltage calculating means calculates the reference voltage value based on the corrected resistance value of the stator winding together with the reference primary angular frequency, said torque calculating means calculating the torque further with reference to the resistance of the stator winding.

6. A control apparatus according to claim 4, wherein said reference voltage calculating means includes a voltage vector calculator connected to the reference frequency calculating means for calculating values of axis components of a primary voltage, a coordinate transformer situated between the voltage vector calculator and the inverter, and an integrator situated between the reference frequency calculating means and the coordinate transformer for calculating a reference vector position, said coordinate transformer calculating the reference voltage value based on the values of the axis components of the primary voltage and the reference vector position.

\* \* \* \* \*